Figure 1:
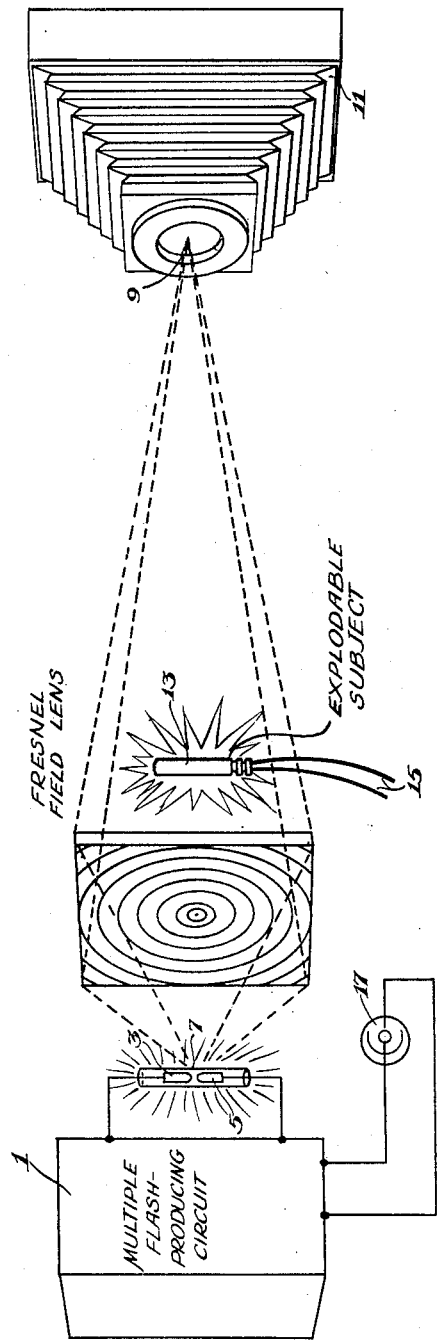

Feb. 19, 1957  H. E. EDGERTON  2,781,707
MULTIPLE LIGHT-FLASH-PRODUCING SYSTEM
Filed Sept. 12, 1952  2 Sheets-Sheet 1

INVENTOR.
HAROLD E. EDGERTON
BY Rines and Rines
ATTORNEYS

Feb. 19, 1957  H. E. EDGERTON  2,781,707
MULTIPLE LIGHT-FLASH-PRODUCING SYSTEM
Filed Sept. 12, 1952  2 Sheets-Sheet 2

INVENTOR.
HAROLD E. EDGERTON
BY Rines and Rines
ATTORNEYS

United States Patent Office 2,781,707
Patented Feb. 19, 1957

2,781,707

MULTIPLE LIGHT-FLASH-PRODUCING SYSTEM

Harold E. Edgerton, Belmont, Mass.

Application September 12, 1952, Serial No. 309,307

17 Claims. (Cl. 95—11)

The present invention relates to multiple light-flash-producing systems and more particularly, to apparatus in which light flashes of duration of the order of a microsecond or less are produced at intervals of the order of microseconds.

It has heretofore been proposed, as in my prior United States Letters Patent No. 2,186,013, issued January 9, 1940, to utilize a repetitively discharged flash tube for producing successive light flashes, say of $1/10,000$ of a second duration, that enable the photographing of objects in motion or other phenomena occurring at high speeds. Such devices are entirely satisfactory for many applications of multiple flash photography. It is sometimes required, however, that the light flashes be of much briefer duration, say of the order of a microsecond or a fraction thereof, and that the flashes occur once every microsecond or every few microseconds. It is not physically possible to operate such flash-tube apparatus, however, to produce such short and rapidly occurring light flashes because the flash condenser that discharges through the flash tube cannot successively charge to its necessary high voltage value in such short time intervals.

An object of the present invention, therefore, is to provide a new and improved electrically operated light-flash-producing system that, while of more general utility, is particularly adapted for producing microsecond light flashes at intervals of the order of microseconds.

In accordance with a feature of the invention, this end is achieved through the use of a plurality of successively operated discharge devices. While it has heretofore been proposed to utilize a plurality of flash lamps energized in sequence by successively discharged flashing condensers, this has been for the purpose of providing a moving light beam as for beacons. A system of this character is described, for example, in my prior United States Letters Patent 2,478,908, issued August 16, 1949. Such a system, however, does not provide successive light flashes emanating from a fixed source as may be required for multiple-flash photography.

A further object of the present invention is to provide a multiple light-flash-producing apparatus that will produce successive light flashes at a common fixed point. This is achieved, in accordance with a preferred embodiment of the invention, by connecting a single flash tube in the discharge circuits of all of the plurality discharge devices and sequentially producing successive triggering voltages for accurately producing short discharges in the successive discharge devices in order successively to flash the flash tube.

An additional object of the invention is to provide a new and improved photographic apparatus utilizing such a multiple light-flash-producing system.

Other and further objects will be explained hereinafter and will be more particularly pointed out in the appended claims.

Figure 2:
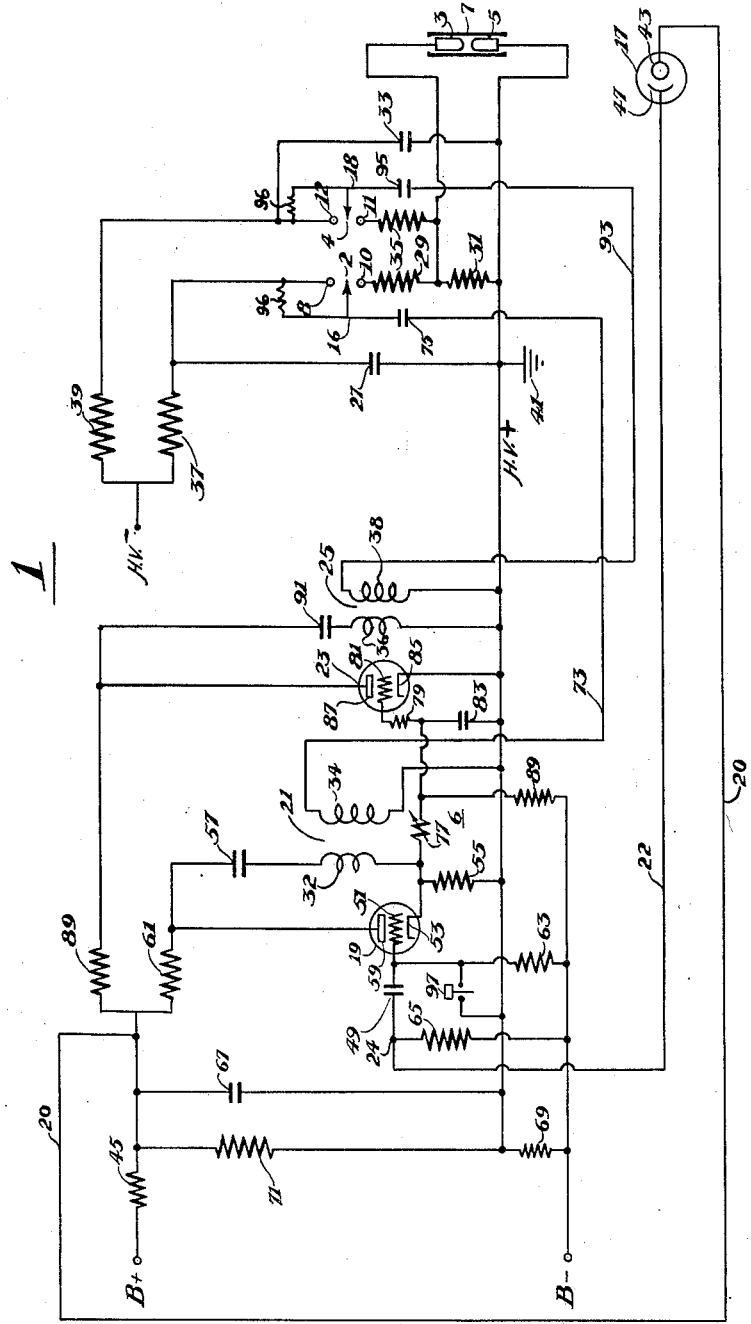

The invention will now be more fully described in connection with the accompanying drawings, Fig. 1 of which is a schematic view illustrating the multiple light-flash-producing apparatus of the present invention applied to silhouette photography; and Fig. 2 is a schematic circuit diagram of a preferred multiple light-flash-producing circuit for use in the system of Fig. 1.

In Fig. 1, a multiple light-flash-producing circuit 1 is shown energizing the principal electrodes 3 and 5 of a flash tube or lamp 7, the details of which will hereinafter be described. The light produced from the flashes of the tube 7 is focused by a Fresnel field lens, as of plastic, upon the lens 9 of a photographic camera 11. The lens 9 may be stopped down by a conventional diaphragm, not shown, without a loss of light on the camera film, also not shown, if the image of the flashes does not fill the camera lens 9.

If it is desired to obtain silhouette photographs, as small an aperture as possible should preferably be used at the lens 9 to exclude light from the subject to be photographed. This subject is shown, for illustrative purposes, as an explodable dynamite cap 13, energizable by conductors 15, but it may comprise any other rapidly moving object. Though the successive light flashes of the lamp 7 are focused on the camera lens 9, producing out-of-focus images of the light flashes on a substantial area of the film, the image of the subject 13 is focused upon the camera film so that successive shadows of the subject 13 are photographed.

If, on the other hand, it is desired to produce normal photographs of the subject instead of silhouettes, the same equipment may be used to produce ample light for reflected-light photography. It is merely necessary to direct the light flashes upon the subject 13 and to focus the light reflected from the subject 13 upon the photographic film of the camera 11. The system may also be adapted for the production of Schlieren-type photographs, in which case the image of the light flashes produced by the flash tube 7 should be deflected so that only a portion of the light goes into the camera lens 9, as is well known.

The taking of the photographs may, if desired, be synchronized with the behavior or operation of the subject. In the case of subjects that emit their own light, such as the explodable subject 13, the illumination from the subject may energize a photocell 17 that, in turn, may initiate the operation of the multiple light-flash-producing circuit 1.

Assuming for the moment that light flashes are produced by the system 1-7 of duration of the order of a fraction of a microsecond, spaced a time interval of the order of a microsecond or two, successive shadow, reflected-light, Schlieren-type or other photographs may thus be produced upon the camera film to demonstrate the progress of the explosion of the subject 13 at these short successive intervals of time. Such photographs may be used to determine the velocity of the explosion and various other details concerning the explosive process. The invention, of course, as before stated, may be used with other subjects than explodable subjects, such as a subject moving at a high rate of speed and the motion of which it is desired to study over very brief intervals of time of the order of microseconds.

In the preferred circuit arrangement of Fig. 2, the multiple light-flash-producing system 1 is shown comprising circuits for producing a pair of successive fractional microsecond light-flashes, spaced a few microseconds apart. It is to be understood, however, that additional flash-producing circuits of this same character may be employed and that the invention is not limited to the use of circuits for producing but two flashes. The two-flash system has particular application in connection with the study of the before-discussed explodable dynamite caps and the like.

Basically, the system 1 comprises a pair of discharge devices 2 and 4 through which successive discharges are passed in order to effect the successive flashing of the tube 7. A first trigger device, shown as a gaseous-discharge tube 19, as of the thyratron type, is connected with the photocell 17 to produce a first trigger pulse in a trigger transformer 21 that causes the discharge through the discharge device 2 and thus produces a first flash of light in the tube 7. The illumination produced in the photocell 17 by the explosion of the subject 13 thus initiates the operation of the multiple-flash-producing system 1. A time-constant-controlled electric network, generally indicated by the reference numeral 6, connects the thyratron trigger device 19 to a second similar trigger device 23 for delaying the production of a second trigger pulse in a second trigger transformer 25 a few microseconds after the production of the first flash of light in the flash tube 7. This delayed trigger pulse in the transformer 25 triggers the second discharge device 4 and thus produces a second flash of light through the flash tube 7 a time interval of the order of microseconds after the first flash of light.

The discharge devices 2 and 4 may themselves be used as the light-producing sources, in which event the flash device 7 will not be needed. Such operation, however, requires that the successive light flashes originate from different positions or locations. Where this is unobjectionable, such a system may be used. Where, however, it is desired that the light flashes emanate from the same fixed single location, as in the system of Fig. 1, the flash tube 7 is employed.

The flash devices 2 and 4 are preferably in the form of spark-gap three-electrode elements having respective principal electrodes 8, 10, and 11, 12, and trigger electrodes 16 and 18. As before stated in connection with the prior-art multiple flashing systems, it would not be possible to utilize a single spark-gap for producing the closely spaced short-duration pulses involved in the present invention in view of the physical limitations on the rapid successive charging and discharging of the same flash condenser through the spark-gap. Instead, it is necessary to provide a separate flash condenser for each of the discharge devices 2 and 4 and simultaneously to charge the flash condensers. The flash condenser 27 is shown connected between the principal electrode 8 and, through the resistors 31 and 29, the principal electrode 10 of the discharge device 2. The flash condenser 33 is similarly shown connected between the principal electrode 12 and, through the same resistor 31 and a further resistor 35, the principal electrode 11 of the discharge device 4. The condensers 27 and 33 are simultaneously charged in parallel paths in the circuits traceable from the terminal labelled H. V.— through respective charging resistors 37 and 39 to a common terminal labelled H. V.+. The H. V.+ terminal is the positive terminal of a high-voltage source of direct-current energy which may, for example, be of the order of 8 kilovolts, and the terminal H. V.— is the negative terminal of the source, H. V.+ being shown preferably grounded at 41. Before the application of a stimulus to their trigger electrodes 16 and 18, the discharge devices 2 and 4 are held non-conductive, so that they normally can not discharge the energy of the respective charged condensers 27 and 33.

The thyratron trigger device 19 for rendering the discharge device 2 conductive has an anode 59, a control electrode 51 and a cathode 53. Anode voltage is supplied through a load 61 and a series resistor 45 from the B+ or positive terminal of the thyratron plate-supply voltage source which is of considerably lower voltage value than the H. V. source. The cathode 53 is connected through a resistor 55 to the ground terminal 41 that, in turn, forms the junction of the plate-supply bleeder network resistors 71 and 69. A plate-supply condenser 67 shuts the resistor 71. The B— or negative terminal of the thyratron plate supply source is connected to the lower terminal of the resistor 69 and, in turn, applies a negative cut-off bias on the grid 51 of the thyratron 19 through a resistor 63. The thyratron 19 is thus initially non-conducting. The thyratron 23 is similarly initially non-conducting as a result of the application of this negative bias from the B— terminal through a resistor 89 and a further resistor 79 to its control electrode 81. The anode 87 of the thyratron 23 is connected to the B+ terminal in parallel with the anode 59 of the thyratron 19 through a load 89 and the series resistor 45. The cathode 85 of the thyratron 23 is connected directly to the ground terminal 41.

Between the anodes and cathodes of the thyratrons 19 and 23 are connected storage condensers in series with the left-hand or primary windings of the respective transformers 21 and 25. The storage condenser 57 is connected through the primary winding 32 of the transformer 21 between the anode 59 and the cathode 53 of the thyratron 19 and becomes charged during the quiescence of the thyratron 19 from the B+ plate supply, through resistors 45 and 61, 55 and 69. The storage condenser 91 is similarly simultaneously charged through the resistors 45, 89 and 69 since it is connected through the primary winding 36 of the transformer 25 between the anode 87 and the cathode 85 of the normally non-conductive thyratron 23.

Upon the emission of illumination by the explodable subject 13 and the impingement of the illumination upon the photocell 17, a positive voltage is applied to the control electrode 51 of the thyratron 19 to render the same suddenly conductive. This positive voltage results from the conduction of the photocell between its anode 43 and cathode 47, completing or closing a normally open circuit traceable from the B+ terminal through resistor 45 and by way of conductor 20 to the photocell anode 43, thence through the photocell 17 to its cathode 47, and by conductor 22 and through resistor 65 to the B— terminal. The upper terminal 24 of the resistor 65 is thus rendered positive and a positive triggering voltage is applied through condenser 49 to the control electrode 51 of the thyratron 19. The condenser 57 then rapidly discharges in an oscillatory discharge circuit comprising the primary winding 32 and the conducting tube 19, and the time constants of which are chosen so that the half-period of the oscillations of the discharge corresponds preferably to a microsecond or so, or a fractional part thereof. The subsequent half-cycle of the oscillation cuts off the thyratron by rendering its anode 59 negative with respect to the cathode 53, so that a desired microsecond trigger impulse is impressed in the secondary winding 34 of the transformer 21. As an illustration, with a condenser 57 (and 91) of about 0.01 microfarad and the hereinafter described transformer windings 21 (and 25), pulses of the order of a fifth to a half microsecond have been produced in the secondary winding of the transformer. This trigger pulse is in turn impressed from the secondary winding 34 by way of conductor 73 and through a coupling condenser 75 upon the trigger electrode 16 of the discharge gap 2, rendering the same rapidly conductive. The condenser 27 then discharges through the conductive gap 2 between the principal electrodes 8 and 10. To insure timing accuracy, the voltage pulses from the trigger transformer 21 (and 25) must rapidly rise to ample voltage value for triggering the gap 2 (and 4) promptly. The transformers used for such purpose may, for example, have a 1-to-15 primary-to-secondary winding turns ratio on a closed core. The secondary-winding voltage may, for example, reach 10 kilovolts in about 1 microsecond, and the trigger gap 2 (and 4) may fire in less than half of a microsecond.

Inasmuch as the electrodes 3 and 5 of the flash or spark-discharge tube 7 are connected across the load resistor 31, a flash or spark is produced between the electrodes 3 and 5 in response to the discharge through the discharge gap 2, and a first light flash of duration of the order of a microsecond or a fractional part thereof is produced.

The circuit inductance in the discharge circuit of the spark-gap condenser 27 (and 33) is preferably reduced to a minimum since the frequency of oscillations of the discharge determines the maximum rate at which energy can be discharged into the gap. The gaps of the discharge device 2 (and 4) have negligible resistance and therefore appropriate substantially critical damping resistance is required to prevent the circuit from oscillating. Normally such an undamped low-inductance circuit will oscillate about 10 cycles before the amplitude is down to one-third of its initial value, so that critical damping is essential to maintaining the desired microsecond or fractional micro-second flash duration. The critical damping resistance R is related to the capacitance C of the condenser 27 or 33 and the frequency $f$ of oscillations as follows:

$$R = \frac{1}{\pi C f}$$

With a condenser 27 (or 33) of value about $0.005 \times 10^{-6}$ farads, for example, and a frequency of discharge oscillations of $3 \times 10^6$ cycles, the damping resistance calculates to about 20 ohms. This 20-ohm critical damping resistor is the resistor 29 (or the resistor 35). In actual practice, a somewhat lower resistance value may be used, and some of the oscillations may be tolerated in consideration of the possible reduction in light output. The resistor 31, however, common to the gap-discharge circuits of both the gaps 2 and 4, is relatively high, say, of the order of $10^5$ ohms, and it must be capable of taking the before-mentioned illustrative 8-kilovolt discharge voltage produced thereacross. A high-voltage type of resistor should therefore be utilized. The flash or spark tube 7 itself may comprise 40 mil nickel wire terminals connected to the pair of preferably rounded electrodes 3 and 5 spaced in air about one-eighth of an inch. It has been found that erratic performance can be minimized through the rounding of the electrodes and that consistent starting without time jitter can be achieved through the use of a glass tube 7 fitting closely about the electrodes 3 and 5 to bridge the gap.

Accompanying the rendering conductive of the thyratron 19 is the sudden rising of the potential upon its cathode 53. Were this cathode directly connected to the control electrode 81 of the thyratron 23, this sudden potential rise would render the thyratron 23 rapidly conductive and effect the triggering of the spark gap 4. It is desired as before explained, however, to delay this triggering an interval of time of the order of a microsecond or a few microseconds. To this end, the before-mentioned delay circuit 6 is connected between the cathode 53 of the thyratron 19 and the control electrode 81 of the thyratron 23 to delay the conduction of the second thyratron 23. The delay circuit 6 is illustrated as a time-constant-controlled electric network comprising a variable resistor 77 connected between the cathode 53 of the thyratron 19 and, through a further resistor 79, the control electrode 81 of the thyratron 23, and a condenser 83 connected from the junction of the resistors 77 and 79 to the ground terminal 41. When the cathode 53 suddenly becomes positive in response to the conduction of the thyratron 19, this positive impulse passes through the resistor 77 and condenser 83 charging the condenser 83 positively in a time dependent upon the time constant of these elements. This time may be varied by varying the value of the resistor 77. It may, for example, be adjusted to a value of the order of one to three microseconds, or to any other desired short time interval. Upon the positive charging of the condenser 83, the grid 81 to which the condenser 83 is connected through the resistor 79 becomes positive, also, and the thyratron 23 suddenly conducts. The condenser 91 rapidly discharges through the primary winding 36 of the transformer 25 and the conducting thyratron 23, as discussed in connection with the discharge of the condenser 57, producing the desired short triggering impulse in the secondary winding 38. This triggering impulse in the secondary winding 38 of the transformer 25 is fed by conductor 93 through a coupling condenser 95 to the trigger electrode 18 of the discharge device 4. The discharge gap 4 thus is rapidly triggered to discharge the voltage of the condenser 33 therethrough and thus to produce a voltage pulse across the resistor 31 that again flashes the tube 7. This further flashing of the tube 7 occurs, moreover, a time after the first flashing of the tube 7 in response to the discharge of the trigger gap 2, that corresponds to the time-delay setting of the time-delay circuit 6, namely, a microsecond or a few microseconds in the example above discussed. The resistors 96 maintain the trigger electrodes 16 and 18 at the potential of the respective principal electrodes 8 and 12 before the discharges.

It has been found that the flash intensity produced by the discharge of the second discharge-gap condenser 33 is generally, in practice, somewhat less than that produced by the discharge of the condenser 27, even though the condensers are simultaneously charged from the same H. V. source. In order to produce successive light flashes from the tube 7 that are of equal flash intensity, therefore, it is desirable to increase the value of the second discharge-gap condenser 33. In one apparatus, for example, the value of the condenser 33 was made two times the value of the condenser 27 in order to produce successive light flashes of substantially equal light intensity.

As an illustration of a practical application of the circuit of Fig. 2 to the system of Fig. 1, the shock wave of a bursting dynamite cap 13 has been photographed with one-fifth microsecond pulses delayed about four microseconds apart. During this time, the shock wave of the dynamite cap moved about 0.4 inch and the average velocity over this time interval was found from the silhouette photographs to be about 0.1 inch per microsecond or about 8000 feet per second.

If it is desired to initiate the triggering of the device 1 by other than an object that emits light, instead of the photocell 17, a push button conrol 97 may be utilized that grounds the control electrode 51 of the thyratron 19 and thus causes the thyratron 19 to conduct and discharge the condenser 57 therethrough, setting off the multiple-flash system. Other well-known types of trigger devices than thyratrons may also be employed, as may other types of discharge devices 2 and 4 and flash devices 7, though the described arrangement has been found to produce very satisfactory results. Similarly other types of delay systems 6 may be employed such as a length of coaxial line for a fixed delay, or more precise time-constant coupling circuits.

Further modifications will occur to those skilled in the art and all such are considered to fall within the spirit and scope of the invention, as defined in the appended claims.

What is claimed is:

1. A light-flash producing system having, in combination, a plurality of condensers, a plurality of normally non-conductive discharge devices through which electric energy may discharge when conductive, one discharge device corresponding to each condenser, a discharge circuit connecting each condenser to its corresponding discharge device to enable the discharge of the electric energy charged in the condenser through its corresponding discharge device when the discharge device is rendered conductive, the discharge circuits sharing a common load impedance, means for charging each condenser, means for applying successive triggering voltages to the successive discharge devices to render the discharge devices conductive rapidly in predetermined sequence in order thereby to permit the discharge of the condensers through their corresponding discharge devices rapidly in the said predetermined sequence, and a common flash lamp connected to the common load impedance of the discharge circuits of the discharge devices and responsive to the discharges of electric energy therethrough for producing light flashes rapidly in the said predetermined sequence at the single location of the flash lamp.

2. A light-flash-producing-and-recording system having, in combination, a plurality of condensers, a plurality of normally non-conductive discharge devices through which electric energy may discharge when conductive, one discharge device corresponding to each condenser, a discharge circuit connecting each condenser to its corresponding discharge device to enable the discharge of the electric energy charged in the condenser through its corresponding discharge device when the discharge device is rendered conductive, the discharge circuits sharing a common load impedance, means for charging each condenser, means for applying successive triggering voltages to the successive discharge devices to render the discharge devices conductive rapidly in predetermined sequence in order to discharge the condensers through their corresponding discharge devices rapidly in the said predetermined sequence, a common flash lamp connected to the common load impedance of the discharge circuits of the discharge devices and responsive to the discharges of electric energy therethrough for producing light flashes rapidly in the said predetermined sequence at a single location, and a field lens for focusing the light flashes produced by the flash lamp upon a camera lens in order to form an out-of-focus image of the flash lamp upon a substantial area of the camera film, thereby to produce rapid shadow exposures upon the film in the said predetermined sequence of an object located between the field lens and the camera and focused upon the film.

3. A light-flash-producing system having, in combination, a plurality of condensers, a plurality of normally non-conductive discharge devices through which electric energy may discharge when conductive, one discharge device corresponding to each condenser, a discharge circuit connecting each condenser to its corresponding discharge device to enable the discharge of the electric energy charged in the condenser through its corresponding discharge device when the discharge device is rendered conductive, means for charging each condenser, means for rendering the discharge devices conductive rapidly in predetermined sequence to discharge the condensers through their corresponding discharge devices rapidly in the said predetermined sequence, a common load connected in all of the discharge circuits of the discharge devices, and a flash lamp connected to the load and responsive to the discharges of electrical energy through the discharge circuits for producing light flashes rapidly in the said predetermined sequence at the single location of the flash lamp.

4. A light-flash-producing system having, in combination, a plurality of condensers, a plurality of normally non-conductive discharge gaps through which electric energy may discharge when conductive, one discharge gap corresponding to each condenser, a discharge circuit connecting each condenser to its corresponding discharge gap to enable the discharge of the electric energy charged in the condenser through its corresponding discharge gap when the discharge gap is rendered conductive, means for charging each condenser, a plurality of normally ineffective trigger devices, one corresponding to each discharge gap, for rendering the corresponding discharge gaps conductive when effective, and means for rendering the trigger devices effective rapidly in predetermined sequence to render the corresponding discharge gaps conductive rapidly in the said predetermined sequence, thereby to discharge the condensers through their corresponding discharge gaps rapidly in the said predetermined sequence, a common load connected in all of the discharge circuits of the discharge gaps, and a flash lamp connected to the load and responsive to the discharges of electric energy through the discharge circuits for producing light flashes rapidly in the said predetermined sequence at the single location of the flash lamp.

5. A light-flash-producing system having, in combination, a plurality of condensers, a plurality of normally non-conductive discharge gaps through which electric energy may discharge when conductive, one discharge gap corresponding to each condenser, a discharge circuit having little inductance and critically damped connecting each condenser to its corresponding discharge gap to enable the discharge of the electric energy charged in the condenser through its corresponding discharge gap when the discharge gap is rendered conductive, means for charging each condenser, a plurality of normally ineffective trigger devices, one corresponding to each discharge gap, for rendering the corresponding discharge gaps conductive when effective, and means for rendering the trigger devices effective rapidly in predetermined sequence in order to render the corresponding discharge gaps conductive rapidly in the said predetermined sequence, thereby to discharge the condensers through their corresponding discharge gaps rapidly in the said predetermined sequence, a common load connected in all of the discharge circuits of the discharge gaps, and a flash lamp connected to the load and responsive to the discharges of electric energy through the discharge circuits for producing light flashes rapidly in the said predetermined sequence at the single location of the flash lamp.

6. A light-flash-producing system having, in combination, a plurality of condensers, a plurality of normally non-conductive discharge gaps through which electric energy may discharge when conductive, one discharge gap corresponding to each condenser, a discharge circuit having little inductance and critically damped connecting each condenser to its corresponding discharge gap to enable the discharge of the electric energy charged in the condenser through its corresponding discharge gap when the discharge gap is rendered conductive, means for charging each condenser, a plurality of normally ineffective trigger devices, one corresponding to each discharge gap, for rendering the corresponding discharge gaps conductive when effective, and means for rendering the trigger devices effective rapidly in predetermined sequence to render the corresponding discharge gaps conductive rapidly in the said predetermined sequence, thereby to discharge the condensers through their corresponding discharge gaps rapidly in the said predetermined sequence, a common resistive load connected in all of the discharge circuits of the discharge gaps, and a flash lamp comprising a pair of electrodes slightly spaced from each other in air and disposed within a closely fitting transparent tube connected to the load and responsive to the discharges of electric energy through the discharge circuits for producing light flashes rapidly in the said predetermined sequence at the single location of the flash lamp.

7. A light-flash-producing-and-recording system having, in combination, a plurality of condensers, a plurality of normally non-conductive discharge gaps through which electric energy may discharge when conductive, one discharge gap corresponding to each condenser, a discharge circuit connecting each condenser to its corresponding discharge gap to enable the discharge of the electric energy charged in the condenser through its corresponding discharge gap when the discharge gap is rendered conductive, means for charging each condenser, a plurality of normally ineffective trigger devices, one corresponding to each discharge gap, for rendering the corresponding discharge gaps conductive when effective, and means for rendering the trigger devices effective rapidly in predetermined sequence in order to render the corresponding discharge gaps conductive rapidly in the said predetermined sequence, thereby to discharge the condensers through their corresponding discharge gaps rapidly in the said predetermined sequence, a common load connected in all of the discharge circuits of the discharge gaps, a flash lamp connected to the load and responsive to the discharge of electric energy through the discharge circuits for producing light flashes rapidly in the said predetermined sequence at a single location, a field lens for focusing the light flashes produced by the flash lamp upon a camera lens in order to form an out-of-focus image of the flash lamp upon a substantial area of the camera film, thereby to produce rapid shadow exposures upon the film in the said predetermined sequence of an illumination-producing object located between the field lens and the camera and focused upon the film, and an illumination-sensitive circuit responsive to the illumination produced by the object for initiating the rendering effective of the trigger devices.

8. A light-flash-producing system having, in combination, a plurality of condensers, a plurality of normally non-conductive discharge gaps through which electric energy may discharge when conductive, one discharge gap corresponding to each condenser, a discharge circuit connecting each condenser to its corresponding discharge gap to enable the discharge of the electric energy charged in the condenser through its corresponding discharge gap when the discharge gap is rendered conductive, means for charging each condenser, a plurality of normally ineffective gaseous-discharge trigger devices, one corresponding to each discharge gap, for rendering the corresponding discharge gaps conductive when effective, the trigger devices being interconnected by time-constant-controlled electric network means for insuring their operation in predetermined sequence, means for initiating the rendering of the trigger devices effective rapidly in predetermined sequence in order to render the corresponding discharge gaps conductive rapidly in the said predetermined sequence, thereby to discharge the condensers through their corresponding discharge gaps rapidly in the said predetermined sequence, a common load connected in all of the discharge circuits of the discharge gaps, and a flash lamp connected to the load and responsive to the discharges of electric energy through the discharge circuits for producing light flashes rapidly in the said predetermined sequence at the single location of the flash lamp.

9. A light-flash-producing system having, in combination, a circuit including a first pair of separate condensers and a pair of separate normally non-conductive discharge gaps through which electric energy may discharge when conductive, each discharge gap having a pair of principal electrodes and a trigger electrode, means for simultaneously charging the condensers, a discharge circuit connecting each condenser between the principal electrodes of the corresponding discharge gap, a pair of normally non-conductive gaseous-discharge trigger devices, one corresponding to each discharge gap and each having an anode, a cathode and a control electrode, a second pair of condensers, one connected through a transformer primary winding between the anode and cathode of each trigger device, means for simultaneously charging the second pair of condensers, a pair of secondary transformer windings cooperative with the primary windings, one connected between the trigger electrode and one of the principal electrodes of each discharge gap, means cooperative with the control electrode of one of the trigger devices for rendering the same conductive rapidly to discharge the corresponding condenser of the second pair of condensers between the anode and cathode of the said one trigger device and through the corresponding transformer primary winding, thereby to produce an impulse in the corresponding transformer secondary winding for rendering conductive the corresponding discharge gap and rapidly discharging the corresponding condenser of the first pair of condensers therethrough, a time-constant-controlled electric network connecting the cathode of the said one trigger device to the control electrode of the other trigger device in order to delay the rendering conductive of the other trigger device a predetermined short interval of time after the rendering conductive of the said one trigger device, thereby to delay the rendering conductive of the other discharge gap and the rapid discharge therethrough of its corresponding condenser of the first pair of condensers the said predetermined short interval of time, a common load connected in the discharge circuits of the discharge gaps, and a flash lamp connected to the load and responsive to the discharges of electric energy through the discharge circuits for producing a pair of rapid light flashes delayed by the said predetermined short interval of time.

10. A light-flash-producing system as claimed in claim 9 and in which the means for charging the first pair of condensers is of greater voltage than the means for charging the second pair of condensers, and the condenser of the first pair of condensers for discharging through the said other discharge gap to produce the delayed discharge is of greater capacitance than that of the other condenser of the said first pair of condensers.

11. A light-flash-producing system as claimed in claim 9 and in which the discharge circuits of the discharge gaps are provided with resistance sufficient substantially critically to damp the circuits.

12. A light-flash-producing system as claimed in claim 9 and in which the discharge circuits of the second pair of condensers through the transformer primary windings are oscillatory and the discharge circuits of the discharge gaps are substantially critically damped to produce discharges of the order of a microsecond or a fraction thereof, and the time-constant of the said electric network is adjustable to produce delays of the order of a few microseconds.

13. A light-flash-producing system as claimed in claim 9 and in which the flash lamp comprises a pair of rounded electrodes slightly spaced from each other in air and disposed within a closely fitting light-transparent tube.

14. A light-flash-producing system having, in combination, a plurality of condensers, a plurality of normally non-conductive discharge devices through which electric energy may discharge when conductive, one discharge device corresponding to each condenser and having a pair of principal electrodes and a trigger electrode, a discharge circuit connecting each condenser between the principal electrodes of its corresponding discharge device to enable the discharge of the electric energy charged in the condenser between the principal electrodes of its corresponding discharge device, means for charging each condenser, means for applying successive triggering voltages to the trigger electrodes of the successive discharge devices to render the discharge devices conductive rapidly in predetermined sequence in order to discharge the condensers between the principal electrodes of their corresponding discharge devices rapidly in the said predetermined sequence, and a common flash lamp having a pair of closely spaced gap electrodes connected to all of the discharge circuits of the discharge devices and responsive to the discharges of electric energy therethrough for producing light flashes rapidly in the said predetermined sequence at the single location of the flash lamp.

15. A light-flash-producing system having, in combination, a plurality of condensers, a plurality of normally non-conductive spark-gap discharge devices through which electric energy may discharge when conductive, one spark-gap discharge device corresponding to each condenser and having a pair of principal electrodes and a trigger electrode, a discharge circuit connecting each condenser between the principal electrodes of its corresponding discharge device to enable the discharge of the electric energy charged in the condenser between the principal electrodes of its corresponding discharge device, means for charging each condenser, means for applying successive triggering voltages to the trigger electrodes of the successive discharge devices to render the discharge devices conductive rapidly in predetermined sequence in order to discharge the condensers between the principal electrodes of their corresponding discharge devices rapidly in the said predetermined sequence, and a common flash lamp connected to all of the discharge circuits of the discharge devices and responsive to the discharges of electric energy therethrough for producing light flashes rapidly in the said predetermined sequence at the single location of the flash lamp.

16. A light-flash-producing system having, in combination, at least a pair of condensers, at least a pair of normally non-conductive discharge devices through which electric energy may discharge when conductive, each discharge device corresponding to one of the condensers and having a pair of principal electrodes and a trigger electrode, a discharge circuit connecting each condenser between the principal electrodes of its corresponding discharge device to enable the discharge of the electric energy charged in the condenser between the principal electrodes of its corresponding discharge device, the discharge circuits sharing a common load impedance, means for charging each condenser, means for applying successive triggering voltages to the trigger electrodes of the successive discharge devices to render the discharge devices conductive rapidly in predetermined sequence in order to discharge the condensers between the principal electrodes of their corresponding discharge devices rapidly in the said predetermined sequence, and a common flash lamp connected with the common load impedance of the discharge circuits of the discharge devices and responsive to the discharges of electric energy therethrough for producing light flashes rapidly in the said predetermined sequence at the single location of the flash lamp.

17. A light-flash-producing system having, in combination, at least a pair of condensers, at least a pair of normally non-conductive discharge devices through which electric energy may discharge when conductive, each discharge device corresponding to one of the condensers and having a pair of principal electrodes and a trigger electrode, a discharge circuit connecting each condenser between the principal electrodes of its corresponding discharge device to enable the discharge of the electric energy charged in the condenser between the principal electrodes of its corresponding discharge device, the discharge circuits sharing a common load impedance, means for charging each condenser, means for producing trigger voltages for one of the discharge devices, time-constant-controlled electric network means connected with the trigger-voltage-producing means for producing further trigger voltages in predetermined sequence after the production of the first-named trigger voltages for the other of the discharge devices, means for applying the trigger voltages to the trigger electrodes of the corresponding discharge devices to render them conductive rapidly in succession in order to discharge the condensers between the principal electrodes of their corresponding discharge devices rapidly in the said predetermined sequence, and a common flash lamp connected with the common load impedance of the discharge circuits of the discharge devices and responsive to the discharges of electric energy therethrough for producing light flashes rapidly in the said predetermined sequence at the single location of the flash lamp.

References Cited in the file of this patent

UNITED STATES PATENTS

| 1,946,290 | Lord | Feb. 6, 1934 |
| 2,682,814 | Higonnet et al. | July 6, 1954 |

OTHER REFERENCES

"The Photographic Study of Rapid Events," Text book by W. D. Chesterman, published in Oxford, England, 1951, pages 114–118.